US010041546B2

(12) United States Patent
Courville et al.

(10) Patent No.: US 10,041,546 B2
(45) Date of Patent: Aug. 7, 2018

(54) MULTI-RATE TORSIONAL BAR

(71) Applicant: STEERING SOLUTIONS IP HOLDING CORPORATION, Saginaw, MI (US)

(72) Inventors: Jeffrey P. Courville, Frankenmuth, MI (US); Steven M. Thomas, Saginaw, MI (US); Brian J. Kleinfeld, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 212 days.

(21) Appl. No.: 14/938,136

(22) Filed: Nov. 11, 2015

(65) Prior Publication Data

US 2017/0074328 A1 Mar. 16, 2017

Related U.S. Application Data

(60) Provisional application No. 62/218,295, filed on Sep. 14, 2105.

(51) Int. Cl.
*F16D 3/10* (2006.01)
*F16D 3/223* (2011.01)

(52) U.S. Cl.
CPC ............... *F16D 3/10* (2013.01); *F16D 3/223* (2013.01); *F16D 2300/22* (2013.01); *Y10S 464/906* (2013.01)

(58) Field of Classification Search
CPC ..... F16D 3/10; F16D 3/12; F16D 3/22; F16D 3/223; F16D 3/24; F16D 3/227; F16D 2300/22; F16D 3/224; F16F 15/322; Y10S 464/906
USPC ....... 464/139–146, 160, 161, 167, 169, 180, 464/182, 906
See application file for complete search history.

(56) References Cited

U.S. PATENT DOCUMENTS

| | | | | |
|---|---|---|---|---|
| 3,310,961 A * | 3/1967 | Ristau | F16D 3/221 | 464/146 |
| 4,041,729 A * | 8/1977 | Bilz | B23B 31/38 | 192/56.5 |
| 4,464,143 A * | 8/1984 | Bowyer | F16D 3/227 | 464/146 |

(Continued)

FOREIGN PATENT DOCUMENTS

| | | |
|---|---|---|
| FR | 2838093 A1 | 10/2003 |
| GB | 897771 A | 5/1962 |
| JP | 09229085 A | 9/1997 |

OTHER PUBLICATIONS

Extended European Search Report for EP application No. 16188599.1 dated Feb. 27, 2017.

*Primary Examiner* — Josh Skroupa
(74) *Attorney, Agent, or Firm* — Cantor Colburn LLP

(57) ABSTRACT

A driveline joint includes an outer member, an inner member, and a biasing member. The outer member is connected to a first shaft and has a back wall, an end portion, and an inner surface extending between the back wall and the end portion. The inner member is connected to a second shaft and has a first end, a second end, and an outer surface extending between the first end and the second end. The biasing member is disposed between the back wall and the first end and resists translation of the inner member relative to the outer member.

9 Claims, 7 Drawing Sheets

(56) References Cited

U.S. PATENT DOCUMENTS

| | | | | | |
|---|---|---|---|---|---|
| 4,913,681 | A * | 4/1990 | Green | F16D 3/10 | 464/161 |
| 4,950,206 | A * | 8/1990 | Jacob | F16D 3/2233 | 464/140 |
| 7,481,711 | B2 * | 1/2009 | Fukumura | F16D 3/223 | 403/359.5 |
| 8,221,250 | B2 * | 7/2012 | Roser | F16D 3/065 | 464/161 |
| 8,382,595 | B2 * | 2/2013 | Lonergan, III | F16D 3/227 | 464/906 |
| 8,641,538 | B2 * | 2/2014 | Oh | F16D 3/223 | 464/146 |

* cited by examiner

MULTI-RATE TORSIONAL BAR

CROSS-REFERENCES TO RELATED APPLICATIONS

This patent application claims priority to U.S. Provisional Patent Application Ser. No. 62/218,295, filed Sep. 14, 2015, which is incorporated herein by reference in its entirety.

BACKGROUND OF THE INVENTION

Vehicle drive lines transmit torque or power from a drive source, such as an internal combustion engine, to vehicle wheels. The torque or power may be transmitted through a series of driveline components such as gears, joints, and shafts. The driveline components provide a level of torsional stiffness to satisfy performance requirements. The driveline components also provide a level of compliance to reduce unwanted vibration and harshness. Some vehicle drive lines include drive shafts that are simple one-piece bars having a single torsional stiffness.

SUMMARY OF THE INVENTION

In an illustrative embodiment a driveline joint includes an outer member, an inner member, a cage, and a first biasing member. The outer member is connected to a shaft and has a back wall, an end portion, and an inner surface extending between the back wall and the end portion. The inner surface defines a plurality of ball grooves. The inner member is connected to a second shaft and is received within the outer member. The inner member has a first end, a second end, and an outer surface extending between the first end and the second end. The inner surface defines a plurality of complementary ball grooves. The cage is received within the outer member and is disposed between the inner surface and the outer surface. The cage has a first portion disposed proximate the first end and a second portion disposed proximate the second end. The cage is configured to position a plurality of balls relative to the plurality of ball grooves and the plurality of complementary ball grooves. The first biasing member is received within the outer member and is disposed between the second portion and the end portion.

In another illustrative embodiment, a driveline joint includes an outer member, a first inner member, a first cage, a second inner member, a second cage, and a biasing member. The outer member is connected to a first shaft that extends along a first axis. The outer member has a back wall, an end portion, and an inner surface defining a plurality of ball grooves. The first inner member is connected to a second shaft that extends along a second axis. The first inner member has a first inner member first end, a first inner member second end, and a first outer surface defining a plurality of first complementary ball grooves. The first cage is disposed between the first outer surface and the inner surface. The first cage has a first cage first portion and a first cage second portion disposed opposite the first cage first portion. The second inner member is connected to the second shaft and is spaced apart from the first inner member. The second inner member has a second inner member first end, a second inner member second end, and a second outer surface defining a plurality of second complementary ball grooves. The second cage is disposed between the second outer surface and the inner surface. The second cage has a second cage first portion and a second cage second portion disposed opposite the second cage first portion. The biasing member is disposed between the first cage first portion and the second cage second portion.

In yet another illustrative embodiment, a driveline joint includes an outer member, an inner member, and a biasing member. The outer member is connected to a first shaft that extends along a first axis. The outer member has a back wall, an end portion, and an inner surface extending between the back wall and the end portion. The inner surface defines a threaded region. The inner member is connected to a second shaft that extends along a second axis. The inner member has a first end, a second end, and an outer surface extending between the first end and the second end. The outer surface defines a complementary threaded region that engages the threaded region. The biasing member is disposed between the back wall and the first end and resists translation of the inner member relative to the outer member along the second axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
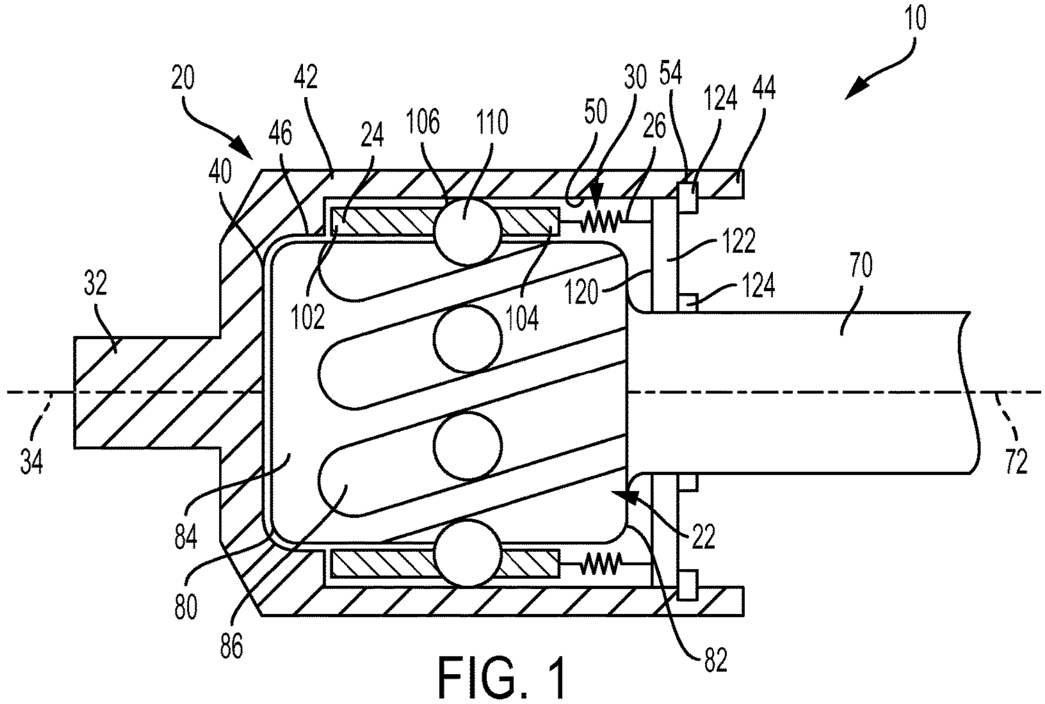
FIG. 1 is a partial sectional view of an illustrative driveline joint.
Figure 2:
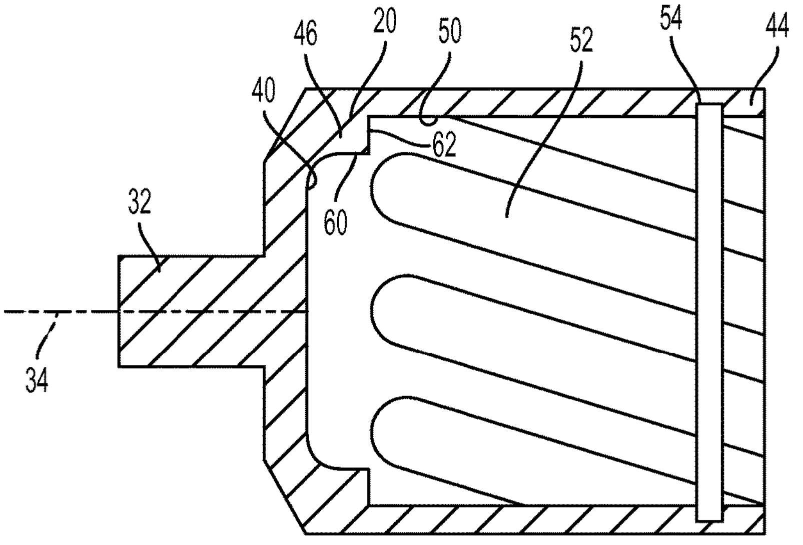
FIG. 2 is a partial sectional view of an outer member of the driveline joint.

Referring now to the Figures, the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-4B, a first illustrative driveline joint 10 is shown. The driveline joint 10 is a torque transmitting interconnecting shaft that provides a multi-rate torsional stiffness. The driveline joint 10 includes an outer member 20, an inner member 22, a cage 24, and a first biasing member 26.

The outer member 20 is configured as a rotary housing defining an inner bore 30. The outer member 20 is connected to a first shaft 32 that extends along a first axis 34. The outer member 20 includes a back wall 40, a side wall 42, an end portion 44, and a stop feature 46. The back wall 40 is disposed substantially perpendicular to the first axis 34. The back wall 40 is disposed opposite and spaced apart from the end portion 44. The side wall 42 extends away from the back wall 40 and extends between the back wall 40 and the end portion 44. The side wall 42 defines an inner surface 50 that extends between the back wall 40 and the end portion 44.

The inner surface 50 defines a plurality of ball grooves 52. The plurality of ball grooves 52 extend along a length of the inner surface 50 from the end portion 44 towards the back wall 40. In at least one embodiment, the plurality of ball grooves 52 is spaced apart from the back wall 40. The plurality of ball grooves 52 extend along and are disposed substantially parallel to the first axis 34. The plurality of ball grooves 52 have a helical arrangement with an angular offset from the first axis 34. Each ball groove of the plurality of ball grooves 52 are radially spaced apart about the first axis 34.

The inner surface 50 defines a retainer groove 54. The retainer groove 54 extends at least partially around the end portion 44. The retainer groove 54 extends from the inner surface 50 into the side wall 42. In at least one embodiment, the inner surface 50 defines a threaded region 56. The threaded region 56 may be spaced apart from a distal end of the side wall 42.

The stop feature 46 is formed by the outer member 20 and extends between the back wall 40 and the inner surface 50 of the side wall 42. The stop feature 46 is a stepped surface defined by a first surface 60 and a second surface 62. The first surface 60 extends away from the back wall 40 towards the end portion 44. The first surface 60 is disposed substantially parallel to the first axis 34 and is disposed substantially parallel to the inner surface 50. In at least one embodiment, the first surface 60 defines a recess 64. The recess 64 extends away from the first axis 34 into the side wall 42. The recess 64 may be formed as a pocket, a groove, a divot, or the like. A second recess may be radially spaced apart from the recess 64.

The second surface 62 extends away from the first surface 60 towards the inner surface 50. The second surface 62 is disposed substantially perpendicular to the first axis 34, is disposed substantially perpendicular to the first surface 60, and is disposed substantially perpendicular to the inner surface 50.

The inner member 22 is configured as a rotary member that is received within the inner bore 30 of the outer member 20. The inner member 22 is connected to a second shaft 70 that extends along a second axis 72. The inner member 22 includes a first end 80, a second end 82, and an outer surface 84 extending between the first end 80 and the second end 82.

The first end 80 is disposed proximate the back wall 40 of the outer member 20. The first end 80 is substantially parallel to the back wall 40 of the outer member 20. The second end 82 is spaced apart from and disposed opposite the first end 80. The second end 82 is disposed proximate the end portion 44 of the outer member 20. The second shaft 70 extends away from the second end 82.

The outer surface 84 defines a plurality of complementary ball grooves 86. The complementary ball grooves 86 extend along a length of the outer surface 84 from the second end 82 towards the first end 80. In at least one embodiment, the plurality of complementary ball grooves 86 are spaced apart from the first end 80. The plurality of complementary ball grooves 86 extend along and are disposed substantially parallel to the second axis 72. The plurality of complementary ball grooves 86 have a helical arrangement with an angular offset from the second axis 72. Each ball groove of the plurality of complementary ball grooves 86 are radially spaced apart about the second axis 72.

Figure 4A:
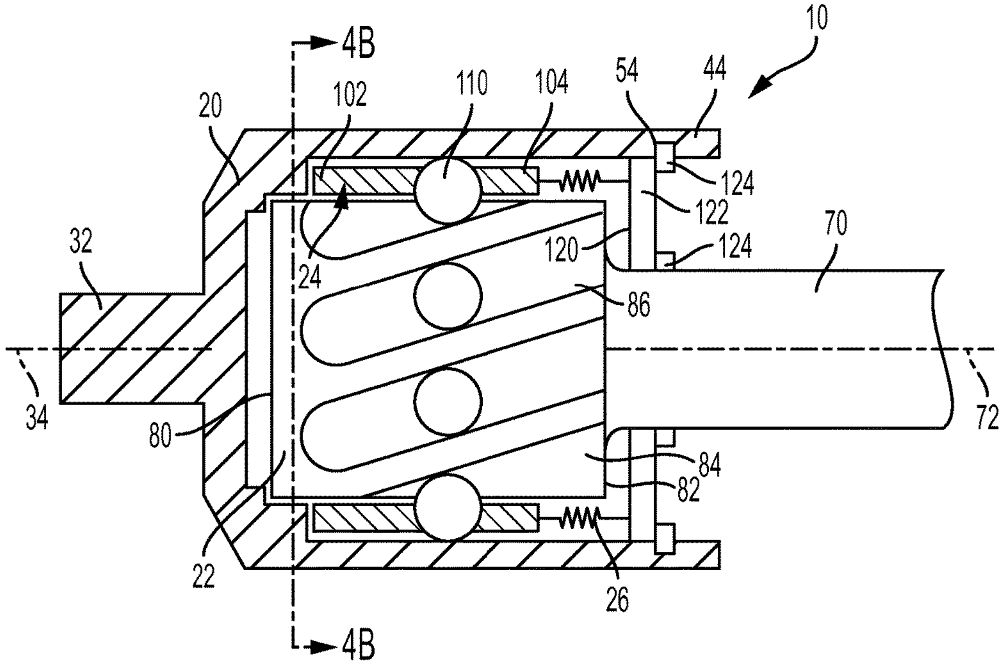
FIGS. 4A and 4B are a partial sectional views of the driveline joint and an end view of the partial sectional view of the driveline joint.
Figure 4B:
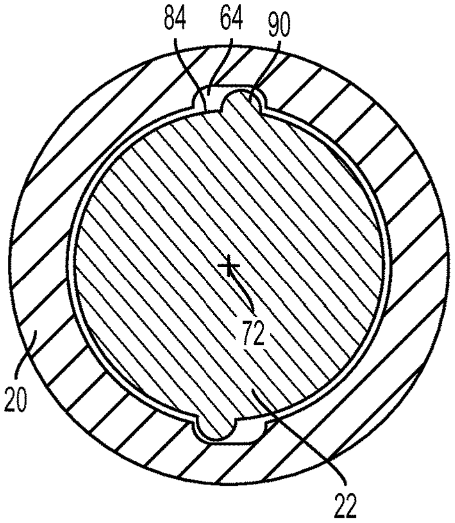

Referring to FIG. 4B, the outer surface 84 includes a stop tooth 90 disposed proximate the first end 80. The stop tooth 90 extends away from the outer surface 84 and extends away from the second axis 72. The stop tooth 90 is configured to be received within the recess 64 such that the engagement of the stop tooth 90 with a surface of the recess 64 limits rotation of the inner member 22 relative to the outer member 20 as an input torque that results in rotation of the second shaft 70 is applied to the second shaft 70. The engagement of the stop tooth 90 with a surface of the recess 64 increases the torsional stiffness of the driveline joint 10 as a torque is driven through the inner member 22 and the outer member 20.

The cage 24 is received within the inner bore 30 of the outer member 20. The cage 24 is disposed between the inner surface 50 of the outer member 20 and the outer surface 84 of the inner member 22. The cage 24 includes a first portion 102 and a second portion 104 disposed opposite and spaced apart from the first portion 102. The first portion 102 is disposed proximate the first end 80 of the inner member 22. The second portion 104 is disposed proximate the second end 82 of the inner member 22.

The cage 24 defines at least one cage window 106 disposed between the first portion 102 and the second portion 104. The cage window 106 is configured to receive a ball member 110 such that the cage 24 positions a plurality of ball members relative to the plurality of ball grooves 52 of the outer member 20 and relative to the plurality of complementary ball grooves 86 of the inner member 22. The cage window 106 extends completely through the cage 24 such that a ball member 110 is received within the cage window 106 and extends above an outer surface of the cage 24 that faces towards the inner surface 50 of the outer member 20 and extends below an inner surface of the cage 24 that faces towards the outer surface 84 of the inner member 22. In at least one embodiment, the cage window 106 may extend partially through the cage 24.

An input torque applied to the second shaft 70 connected to the inner member 22 is transmitted to the first shaft 32 connected to the outer member 20. The input torque results in rotation of at least one of the second shaft 70 and the first shaft 32. The driveline joint 10 is provided with a mechanism that provides a low shaft stiffness at low torques (or input torques less than an input torque threshold) and as the torque applied is increased (achieves an input torque greater than an input torque threshold), the mechanism provides an increased shaft stiffness, therefore providing a multi-rate stiffness interconnecting shaft. It is also contemplated that the driveline joint 10 may have multiple other torsional stiffnesses based on its configuration.

The combination of the first biasing member 26 and the cage 24 may provide multiple torsional stiffnesses responsive to the input torque provided to the second shaft 70. The first biasing member 26 is received within the inner bore 30 of the outer member 20. The first biasing member 26 is disposed proximate the second end 82 of the inner member 22. The first biasing member 26 is disposed between the end portion 44 of the outer member 20 and the second portion 104 of the cage 24. The first biasing member 26 is configured to resist linear motion of the cage 24 relative to at least one of the outer member 20 and the inner member 22 responsive to an input torque applied to the second shaft 70. The first biasing member 26 may be a linear spring, a coil spring, a Belleville washer, an elastomeric component having a variable spring rate, or the like.

The first biasing member 26 is configured to apply a preload to the cage 24. The first biasing member 26 engages the second portion 104 of the cage 24 and a bearing surface 120 of a washer 122 received within the inner bore 30 of the outer member 20. The washer 122 is disposed between the second end 82 of the inner member 22 and the retainer groove 54 of the outer member 20. The washer 122 abuts a retainer ring 124 that is at least partially received within the retainer groove 54. The retainer ring 124 may be a fixed ring such as a snap ring, a press fit ring, or the like.

The washer 122 and the retainer ring 124 cooperate to retain the first biasing member 26 and the inner member 22 within the inner bore 30 of the outer member 20. In response to the angulation of the driveline joint 10 greater than a threshold joint angulation the second end 82 of the inner member 22 engages the bearing surface 120 of the washer 122 and the first end 80 of the inner member 22 engages at least one of the first surface 60 and the second surface 62 to inhibit further driveline joint angulation.

Figure 3:
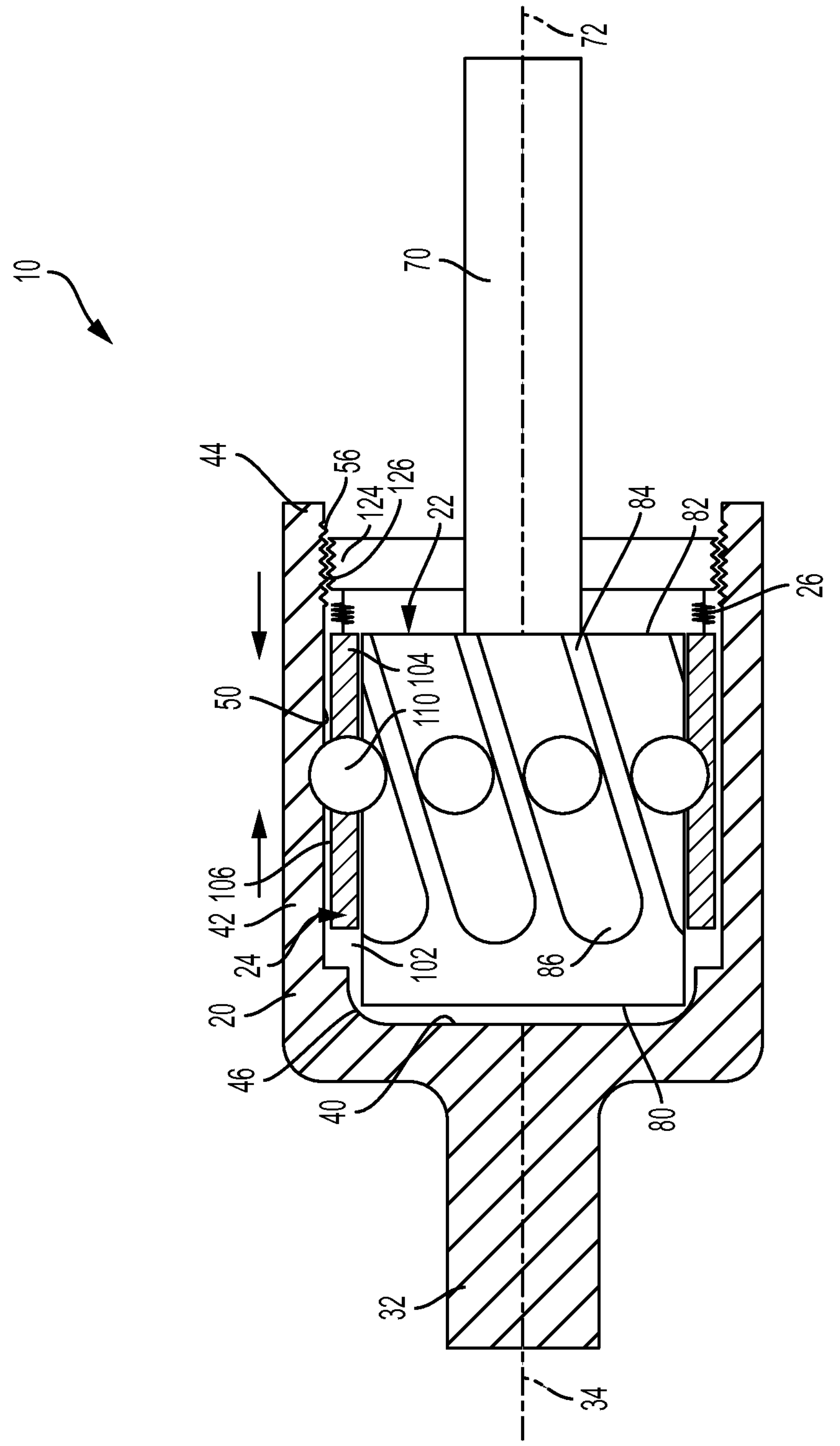
FIG. 3 is a partial sectional view of an illustrative driveline joint.

The adjustment of the distance between the washer 122 and/or retainer ring 124 and the first biasing member 26 adjusts a preload applied to the cage 24 by the first biasing member 26. Referring to FIG. 3, the retainer ring 124 is provided with a set of threads 126 disposed about the periphery of the retainer ring 124 to enable preload adjustment. The threaded region 56 may threadedly receive the set of threads of the retainer ring 124. The retainer ring 124 having the set of threads 126 varies a preload applied by the first biasing member 26 to the cage 24 in response to rotation of the retainer ring 124 relative to the outer member 20.

The combination of the first biasing member 26 and the cage 24 move between a first position (as shown in FIG. 1) and a second position (as shown in FIG. 3). The first position corresponds to an extended position of the first biasing member 26 such that the first portion 102 of the cage 24 is disposed proximate the back wall 40 and or/the stop feature 46, wherein the driveline joint 10 provides a first torsional stiffness. The first portion 102 of the cage 24 engages the back wall 40 and/or the stop feature 46 in response to an input torque applied to the second shaft 70 greater than a threshold input torque in a first direction. The engagement of the first portion 102 of the cage 24 with the back wall 40 and/or the stop feature 46 inhibits further translation of the cage 24 relative to at least one of the outer member 20 and the inner member 22 along the second axis 72.

The second position corresponds to a compressed position of the first biasing member 26 such that the second portion 104 of the cage 24 is disposed proximate a washer 122 wherein the driveline joint 10 provides a second torsional stiffness greater than the first torsional stiffness. The first biasing member 26 bottoms out and is disposed proximate the washer 122 or the retainer ring 124 in response to an input torque applied to the second shaft 70 greater than a threshold input torque in a second direction opposite the first direction. The bottoming out of the first biasing member 26 inhibits further translation of the cage 24 relative to at least one of the outer member 20 and the inner member 22 along the second axis 72.

Figure 5A:
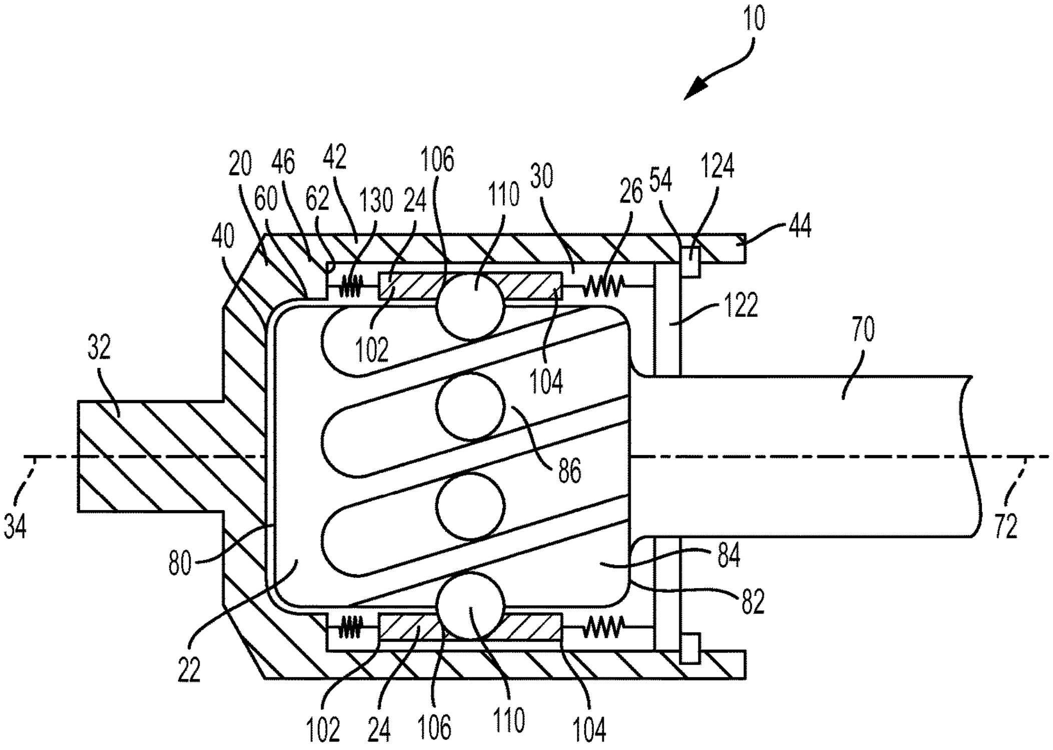
FIG. 5A is a partial sectional view of an illustrative embodiment of a driveline joint.
Figure 5B:
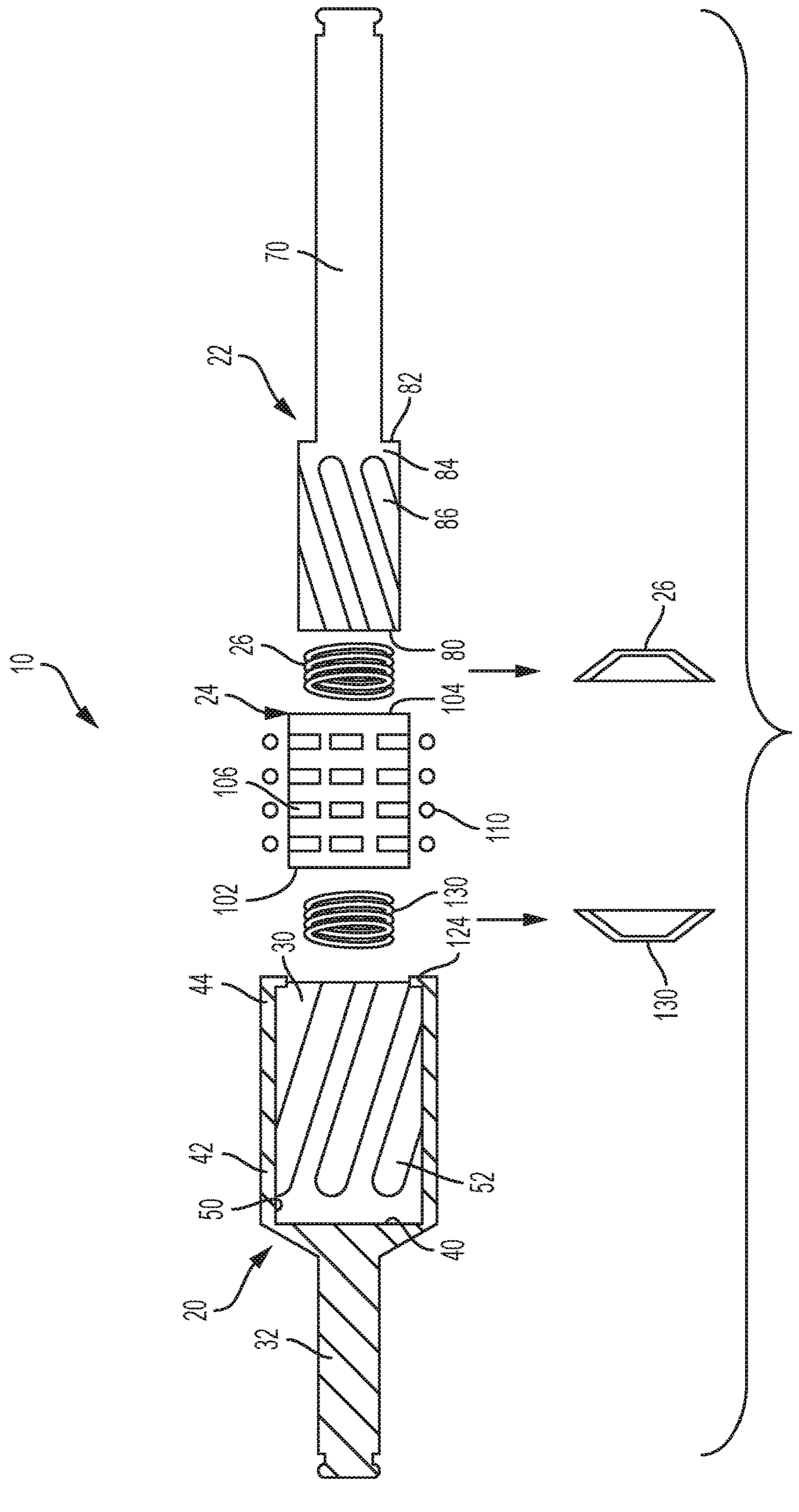
FIG. 5B is a disassembled view of the illustrative embodiment of the driveline joint of FIG. 5A.

Referring to FIGS. 5A and 5B, a second biasing member 130 is provided with the driveline joint 10. The second biasing member 130 is received within the inner bore 30 of the outer member 20. The second biasing member 130 is disposed between the first portion 102 of the cage 24 and the stop feature 46. The second biasing member 130 engages the second surface 62 of the stop feature 46 and the first portion 102 of the cage 24 to provide a biasing force to the cage 24. In at least one embodiment, the biasing force applied by the second biasing member 130 may oppose the biasing force applied by the first biasing member 26 to the cage 24.

Figure 6A:
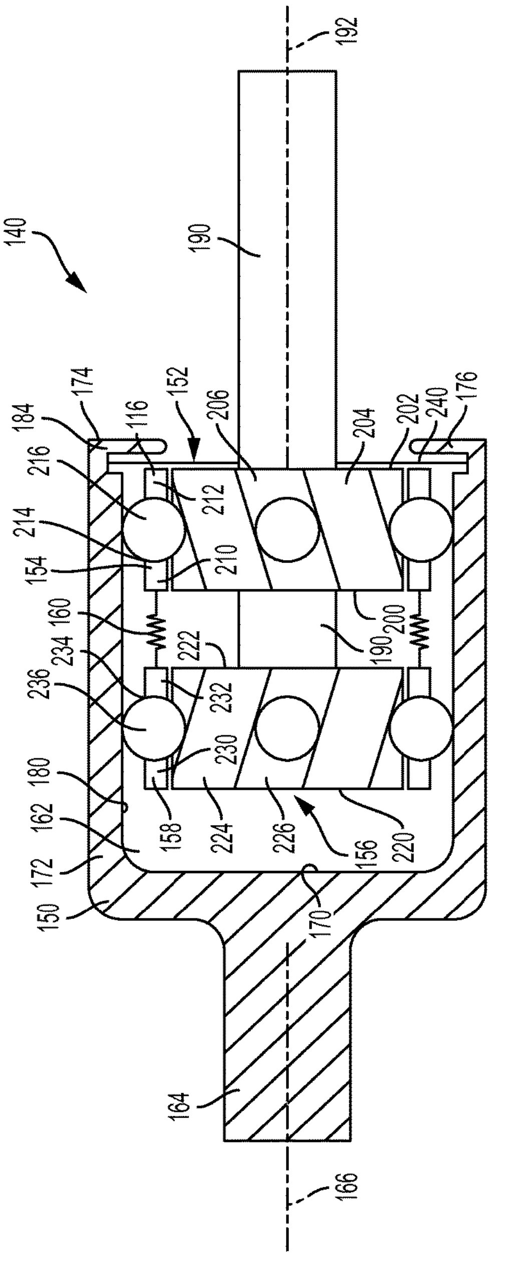
FIG. 6A-6C is a partial sectional view of an illustrative embodiment of a driveline joint.
Figure 6C:
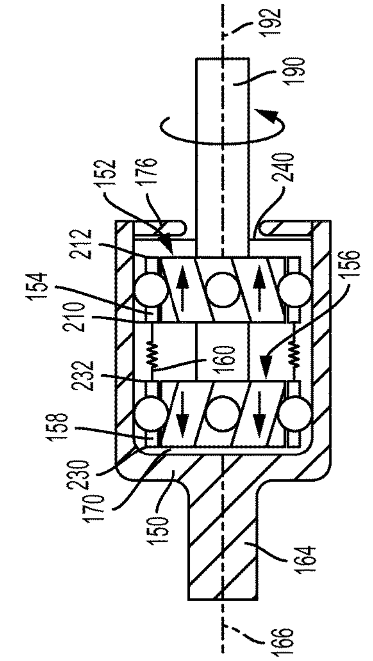
Figure 6B:
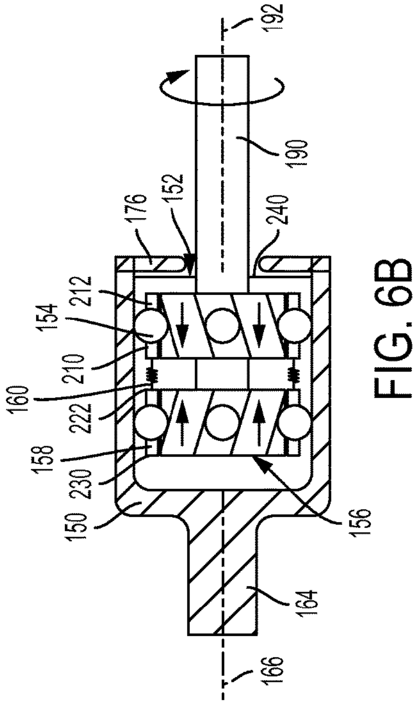

Referring to FIGS. 6A-6C, a second illustrative driveline joint 140 is shown. The driveline joint 140 is a torque transmitting interconnecting shaft that provides a multi-rate torsional stiffness. The driveline joint 140 includes an outer member 150, a first inner member 152, a first cage 154, a second inner member 156, a second cage 158, and a biasing member 160.

The outer member 150 is configured as a rotary housing defining an inner bore 162. The outer member 150 is connected to a first shaft 164 that extends along a first axis 166. The outer member 150 includes a back wall 170, a side wall 172, an end portion 174, and a stop feature 176. The back wall 170 is disposed substantially perpendicular to the first axis 166. The back wall 170 is disposed opposite and spaced apart from the end portion 174. The side wall 172 extends away from the back wall 170 and extends between the back wall 170 and the end portion 174. The side wall 172 defines an inner surface 180 that extends between the back wall 170 and the end portion 174.

The inner surface 180 defines a plurality of ball grooves 182. The plurality of ball grooves 182 extend along a length of the inner surface 180 from the end portion 174 towards the back wall 170. In at least one embodiment, the plurality of ball grooves 182 is spaced apart from the back wall 170. The plurality of ball grooves 182 extend along and are disposed substantially parallel to the first axis 166. The plurality of ball grooves 182 have a helical arrangement with an angular offset from the first axis 166. Each ball groove of the plurality of ball grooves 182 are radially spaced apart from each other about the first axis 166.

The inner surface 180 defines a retainer groove 184. The retainer groove 184 extends at least partially around the end portion 174. The retainer groove 184 extends from the inner surface 180 into the side wall 172.

The stop feature 176 is disposed proximate the end portion 174 and is spaced apart from the retainer groove 184. The stop feature 176 is a protrusion that extends away from the inner surface 180. The stop feature 176 may be integrally formed with the outer member 150 or may be a separate component added to the inner surface 180 of the outer member 150.

The first inner member 152 is configured as a rotary member that is received within the inner bore 162 of the outer member 150. The first inner member 152 is connected to a second shaft 190 that extends along a second axis 192. The first inner member 152 includes a first inner member first end 200, a first inner member second end 202, and a first inner member outer surface 204 extending between the first inner member first end 200 and the first inner member second end 202.

The first inner member first end 200 is substantially parallel to the back wall 170 of the outer member 150. The first inner member second end 202 is spaced apart from and disposed opposite the first inner member first end 200. The first inner member second end 202 is disposed proximate the end portion 174 of the outer member 150.

The first inner member outer surface 204 defines a plurality of first inner member complementary ball grooves 206. The plurality of first inner member complementary ball grooves 206 extend along a length of the first inner member outer surface 204 from the first inner member second end 202 towards the first inner member first end 200. The plurality of first inner member complementary ball grooves 206 extend along and are disposed substantially parallel to the second axis 192. The plurality of first inner member complementary ball grooves 206 have a helical arrangement with an angular offset from the second axis 192. Each ball groove of the plurality of first inner member complementary ball grooves 206 are radially spaced apart from each other about the second axis 192.

The first cage 154 is received within the inner bore 162 of the outer member 150. The first cage 154 is disposed between the inner surface 180 of the outer member 150 and the first inner member outer surface 204. The first cage 154 includes a first cage first portion 210 and a first cage second portion 212 disposed opposite and spaced apart from the first cage first portion 210. The first cage first portion 210 is disposed proximate the first inner member first end 200. The first cage second portion 212 is disposed proximate the first inner member second end 202.

The first cage 154 defines at least one cage window 214 disposed between the first cage first portion 210 and the first cage second portion 212. The cage window 214 is configured to receive a ball member 216 such that the first cage 154 positions a plurality of ball members relative to the plurality of ball grooves 182 of the outer member 20 and relative to the plurality of first inner member complementary ball grooves 206.

The second inner member 156 is configured as a rotary member that is received within the inner bore 162 of the outer member 150. The second inner member 156 is connected to the second shaft 190. The second shaft 190 extends through the first inner member 152 and the second inner member 156. The second inner member 156 is spaced apart from the first inner member 152. The second inner member 156 includes a second inner member first end 220, a second inner member second end 222, and a second inner member outer surface 224 extending between the second inner member first end 220 and the second inner member second end 222.

The second inner member first end 220 is substantially parallel to the back wall 170 of the outer member 150. The second inner member first end 220 is disposed proximate the back wall 170 of the outer member 150. The second inner member second end 222 is spaced apart from and disposed opposite the second inner member first end 220. The second inner member second end 222 faces towards the first inner member first end 200.

The second inner member outer surface 224 defines a plurality of second inner member complementary ball grooves 226. The plurality of second inner member complementary ball grooves 226 extend along a length of the second inner member outer surface 224 from the second inner member second end 222 towards the second inner member first end 220. The plurality of second inner member complementary ball grooves 226 extend axially along and are disposed substantially parallel to the second axis 192. Each ball groove of the plurality of second inner member complementary ball grooves 226 are radially spaced apart from each other about the second axis 192.

The second cage 158 is received within the inner bore 162 of the outer member 150. The second cage 158 is disposed between the inner surface 180 of the outer member 150 and the second inner member outer surface 224. The second cage 158 includes a second cage first portion 230 and a second cage second portion 232 disposed opposite and spaced apart from the second cage first portion 230. The second cage first portion 230 is disposed proximate the second inner member first end 220. The second cage second portion 232 is disposed proximate the second inner member second end 222.

The second cage 158 defines at least one cage window 234 disposed between the second cage first portion 230 and the second cage second portion 232. The cage window 234 is configured to receive a ball member 236 such that the second cage 158 positions a plurality of ball members relative to the plurality of ball grooves 182 of the outer member 150 and relative to the plurality of second inner member complementary ball grooves 226.

An input torque applied to the second shaft 190 connected to the first inner member 152 and the second inner member 156 is transmitted to the first shaft 164 connected to the outer member 150. The input torque results in rotation of at least one of the second shaft 190 and the first shaft 164. The driveline joint 140 is provided with a mechanism that provides a low stiffness shaft or driveline joint at low torques (or input torques less than an input torque threshold) and as the torque applied is increased (approximately achieves an input torque greater than an input torque threshold), the driveline shaft stiffness subsequently increases, therefore providing a multi-rate stifthess interconnecting shaft. It is also contemplated that the driveline joint 140 may have multiple other torsional stiffness is based on its configuration.

The combination of the biasing member 160, the first cage 154, and the second cage 158 provide a mechanism such that the driveline joint 140 may provide multiple torsional stiffnesses responsive to the input torque provided to the second shaft 190. The biasing member 160 is received within the inner bore 162 of the outer member 150. The biasing member 160 is disposed between the first inner member first end 200 and the second inner member second end 222. The biasing member 160 is disposed between and engages the first cage first portion 210 and the second cage second portion 232. The biasing member 160 is configured to resist linear motion of the first cage 154 relative to the first inner member 152 and is configured to resist linear motion of the second cage 158 relative to the second inner member 156 along the second axis 192. The biasing member 160 is configured to resist linear motion of the first cage 154 relative to the second cage 158 along the second axis 192. The biasing member 160 may be a linear spring, a coil spring, a Belleville washer, an elastomeric component having a variable spring rate, or the like.

The biasing member 160 is configured to apply a preload to at least one of the first cage 154 and the second cage 158. The biasing member 160 engages the first cage first portion 210 and the second cage second portion 232.

The first inner member 152, the first cage 154, the second inner member 156, and the second cage 158 are retained within the inner bore 30 of the outer member 150 by a retainer ring 240 received within the retainer groove. In at least one embodiment, the stop feature 176 retains the first inner member 152, the first cage 154, the second inner member 156, and the second cage 158 within the inner bore 30 of the outer member 150.

The combination of the first cage 154, the second cage 158, and the biasing member 160 are longitudinally displaceable within the inner bore 162 responsive to the input torque applied to the second shaft 190. An extended position of the biasing member 160 provides a first torsional stiffness. A compressed position of the biasing member 160 provides a second torsional stiffness greater than the first torsional stifthess.

Referring to FIG. 6B, the biasing member 160 at least partially compresses in response to an input torque applied to the second shaft 190 greater than a threshold input torque in a first direction. The first inner member 152 and the first cage 154 moves closer towards the second inner member 156 and the second cage 158. The first inner member 152 and the first cage 154 are spaced apart from and do not engage the stop feature 176 or the retainer ring 240. The second inner member 156 and the second cage 158 are spaced apart from and does not engage the back wall 170.

Referring to FIG. 6C, the biasing member 160 at least partially extends or expands in response to an input torque applied to the second shaft 190 greater than a threshold input torque in a second direction opposite the first direction. The first inner member 152 and the first cage 154 moves away from the second inner member 156 and the second cage 158. The first inner member 152 and the first cage 154 are spaced apart from and do not engage the stop feature 176 or the retainer ring 240. The second inner member 156 and the second cage 158 is spaced apart from and does not engage the back wall 170. The torsional stiffness of the second driveline joint 140 while the biasing member 160 is at least partially compressed is different than the torsional stifthess of the driveline joint 140 while the biasing member 160 is at least partially extended.

Figure 7:
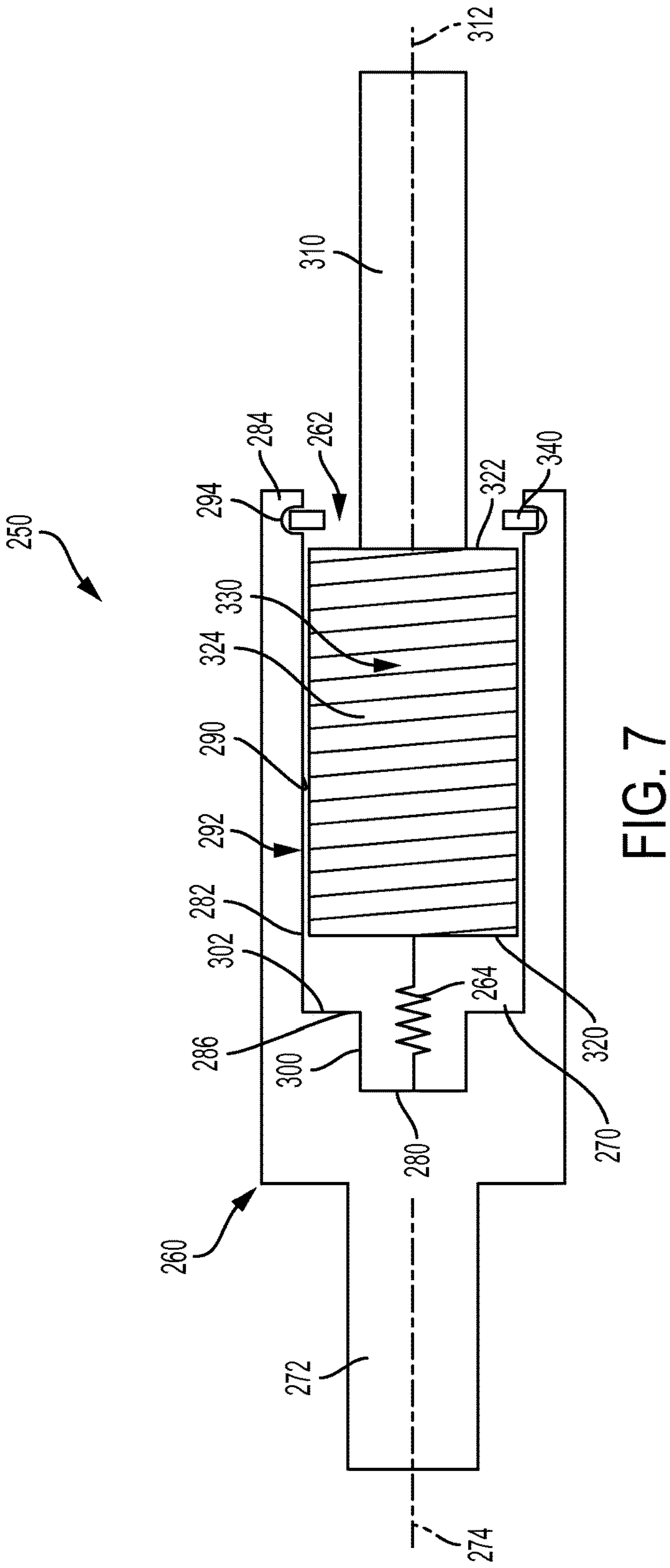
FIG. 7 is a partial sectional view of an illustrative embodiment of a driveline joint.

Referring to FIG. 7, a third illustrative driveline joint 250 is shown. The driveline joint 250 is a torque transmitting interconnecting shaft that provides a multi-rate torsional stiffness. The driveline joint 250 includes an outer member 260, an inner member 262, and a biasing member 264.

The outer member 260 is configured as a rotary housing defining an inner bore 270. The outer member 260 is connected to a first shaft 272 that extends along a first axis 274. The outer member 260 includes a back wall 280, a side wall 282, an end portion 284, and a travel stop 286. The back wall 280 is disposed substantially perpendicular to the first axis 274. The back wall 280 is disposed opposite and spaced apart from the end portion 284. The side wall 282 extends away from the back wall 280 and extends between the back wall 280 and the end portion 284. The side wall 282 defines an inner surface 290 that extends between the back wall 280 and the end portion 284.

The inner surface 290 defines a threaded region 292 and a retainer groove 294. The threaded region 292 extends along a length of the inner surface 50 from the end portion 284 towards the back wall 280. In at least one embodiment, the threaded region 292 is spaced apart from the back wall 280.

The retainer groove 294 extends at least partially around the end portion 284. The retainer groove 294 extends from the inner surface 290 into the side wall 282. The retainer groove 294 may be spaced apart from a distal end of the side wall 42.

The travel stop 286 is formed by the outer member 260 and extends between the back wall 280 and the inner surface 290 of the side wall 282. The travel stop 286 is a stepped surface defined by a first surface 300 and a second surface 302. The first surface 300 extends away from the back wall 280 towards the end portion 284. The first surface 300 is disposed substantially parallel to the first axis 274 and is disposed substantially parallel to the inner surface 290. The second surface 302 extends away from the first surface 300 towards the inner surface 290. The second surface 302 is disposed substantially perpendicular to the first axis 274, is disposed substantially perpendicular to the first surface 300, and is disposed substantially perpendicular to the inner surface 290.

The inner member 262 is configured as a rotary member that is received within the inner bore 270 of the outer member 260. The inner member 262 is connected to a second shaft 310 that extends along a second axis 312. The inner member 262 includes a first end 320, a second end 322, and an outer surface 324 extending between the first end 320 and the second end 322.

The first end 320 is disposed proximate the back wall 280 of the outer member 20 and is spaced apart from the travel stop 286. The first end 320 is substantially parallel to the back wall 280 of the outer member 260. The second end 322 is spaced apart from and disposed opposite the first end 320. The second end 322 is disposed proximate the end portion 284 of the outer member 260. The second shaft 310 extends away from the second end 322.

The outer surface 324 defines a complementary threaded region 330. The complementary threaded region 330 extends along a length of the outer surface 324 from the second end 322 towards the first end 320. The complementary threaded region 330 is configured to threadedly engage the threaded region 292 such that the outer member 260 and the inner member 262 may be configured similar to a ball screw. The inner member 262 is retained within the inner bore 270 of the outer member 260 by a retainer ring 340 received within the retainer groove 294. The retainer ring 340 may be a fixed ring such as a snap ring, a press fit ring, or the like.

An input torque applied to the second shaft 310 connected to the inner member 262 is transmitted to the first shaft 272 connected to the outer member 260. The input torque results in rotation of at least one of the second shaft 310 and the first shaft 272. The driveline joint 250 is provided with a mechanism that provides a low shaft stiffness at low torques (or input torques less than an input torque threshold) and as the torque applied is increased (achieves an input torque greater than an input torque threshold), the mechanism provides an increased shaft stiffness, therefore providing a multi-rate stiffness interconnecting shaft.

The combination of the biasing member 264 and the inner member 262 provide multiple torsional stiffnesses responsive to the input torque provided to the second shaft 310. The biasing member 264 is received within the inner bore 270 of the outer member 260. The biasing member 264 is disposed between the back wall 280 of the outer member 260 and the first end 320 of the inner member 262. The biasing member 264 is configured to resist linear motion of the inner member 262 relative to the outer member 260 along the second axis 312 responsive to an input torque applied to the second shaft 310. The biasing member 264 may be a linear spring, a coil spring, a Belleville washer, an elastomeric component having a variable spring rate, or the like.

The biasing member 264 is configured to apply a preload to the inner member 262. The biasing member 264 engages the first end 320 of the inner member 262.

The inner member 262 and the biasing member 264 are longitudinally displaceable within the inner bore 270 of the outer member 260 responsive to the input torque applied to the second shaft 310. An extended position of the biasing member 264 provides a first torsional stiffness. A compressed position of the biasing member 264 provides a second torsional stiffness greater than the first torsional stiffness.

The biasing member 264 bottoms out in the compressed position and the first end 320 of the inner member 262 may engage the travel stop 286 in response to an input torque applied to the second shaft 310 greater than a threshold input torque in a first direction. The engagement of the first end 320 of the inner member 262 with the travel stop 286 inhibits further translation of the inner member 262 relative to the outer member 260 along the second axis 312.

The biasing member 264 extends in the extended position and the second end 322 of the inner member 262 may engage the retainer ring 340 in response to an input torque applied to the second shaft 310 greater than a threshold input torque in a second direction opposite the first direction. The engagement of the second end 322 of the inner member 262 with the retainer ring 340 inhibits further translation of the inner member 262 relative to the outer member 260 along the second axis 312.

The multiple torsional stiffness provided by the illustrative driveline joints 10, 140, and 250 improve vehicle NVH performance. The lower torsional stiffness provided by the driveline joint at lower torques isolates the engine and other powertrain components from the chassis of the vehicle to reduce the road input to the driver. The higher torsional stiffnesses provided by the driveline joint at higher torques enable a more efficient energy transfer from the powertrain to the vehicle wheels.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A driveline joint comprising:

an outer member connected to a first shaft, the outer member having a back wall, an end portion, an inner surface extending between the back wall and the end portion, a first surface extending from the back wall, and a second surface extending from the first surface to the inner surface, the inner surface defining a plurality of ball grooves;

an inner member connected to a second shaft, the inner member received within the outer member, the inner member having a first end, a second end, and an outer surface extending between the first end and the second end, the outer surface defining a plurality of complementary ball grooves;

a cage received within the outer member and disposed between the inner surface and the outer surface, the cage having a first portion and a second portion, the first portion disposed proximate the first end of the inner member and the second portion disposed proximate the second end of the inner member, the cage configured to position a plurality of balls relative to the plurality of ball grooves and the plurality of complementary ball grooves;

a first biasing member received within the outer member and disposed between the second portion and the end portion; and a second biasing member received within the outer member and engages the first portion and the second surface.

2. The driveline joint of claim 1, wherein the inner surface defines a retainer groove that extends at least partially around the end portion.

3. The driveline joint of claim 2, further comprising a retainer ring at least partially received within the retainer groove.

4. The driveline joint of claim 2, further comprising a washer disposed between the second end and the retainer groove.

5. The driveline joint of claim 1, wherein the first surface is disposed substantially parallel to the inner surface and the second surface is disposed substantially perpendicular to the inner surface.

6. The driveline joint of claim 5, wherein the cage and the first biasing member move between an extended position and a compressed position, wherein the extended position corresponds to a first torsional stiffness and the compressed position corresponds to a second torsional stiffness.

7. The driveline joint of claim 6, wherein the second torsional stiffness is greater than the first torsional stiffness.

8. The driveline joint of claim 6, wherein the first biasing member resists linear motion of the cage relative to the inner member responsive to an input torque applied to the second shaft.

9. The driveline joint of claim 4, wherein the first biasing member engages the washer and the second portion.

* * * * *